United States Patent
Ikeda et al.

(10) Patent No.: US 10,141,595 B2
(45) Date of Patent: Nov. 27, 2018

(54) FUEL CELL STACK

(71) Applicant: HONDA MOTOR CO., LTD., Tokyo (JP)

(72) Inventors: Yuta Ikeda, Wako (JP); Naoki Yamano, Wako (JP); Yoshihito Kimura, Wako (JP); Tadashi Nishiyama, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 100 days.

(21) Appl. No.: 15/292,122

(22) Filed: Oct. 13, 2016

(65) Prior Publication Data
US 2017/0110755 A1    Apr. 20, 2017

(30) Foreign Application Priority Data

Oct. 15, 2015 (JP) .................................. 2015-203620

(51) Int. Cl.
*H01M 8/2483* (2016.01)
*H01M 8/0258* (2016.01)
*H01M 8/04029* (2016.01)

(52) U.S. Cl.
CPC ....... *H01M 8/2483* (2016.02); *H01M 8/0258* (2013.01); *H01M 8/04029* (2013.01)

(58) Field of Classification Search
CPC ......... H01M 2008/1095; H01M 8/026; H01M 8/0267; H01M 8/04067; H01M 8/241; H01M 8/2483
See application file for complete search history.

(56) References Cited

U.S. PATENT DOCUMENTS 5,132,174 A * 7/1992 Romanowski .......... F28F 3/083
                                                                429/434

FOREIGN PATENT DOCUMENTS

| JP | 2001-068141 | | 3/2001 |
| JP | 2007-103242 | | 4/2007 |
| JP | 2007103242 A | * | 4/2007 |
| JP | 2015-088468 | | 5/2015 |

OTHER PUBLICATIONS

Japanese Office Action for corresponding JP Application No. 2015-203620, dated Jul. 4, 2017.

* cited by examiner

*Primary Examiner* — Carlos Barcena
(74) *Attorney, Agent, or Firm* — Mori & Ward, LLP

(57) ABSTRACT

A fuel cell stack includes a stacked body including a plurality of power generation cells stacked in a stacking direction. Insulation members and end plates are provided to sandwich the stacked body therebetween in the stacking direction. A coolant passage is provided between each of the insulation members and each of the end plates. The coolant passage includes a first coolant passage and a second coolant passage. A surface area of a region in which the first coolant passage is provided is larger than a surface area of a region in which the second coolant passage is provided. A flow rate of the coolant flowing through the first coolant passage is larger than a flow rate of the coolant flowing through the second coolant passage.

16 Claims, 6 Drawing Sheets

FUEL CELL STACK

CROSS-REFERENCE TO RELATED APPLICATIONS

The present application claims priority under 35 U.S.C. § 119 to Japanese Patent Application No. 2015-203620, filed Oct. 15, 2015, entitled "Fuel Cell Stack." The contents of this application are incorporated herein by reference in their entirety.

BACKGROUND

1. Field

The present disclosure relates to a fuel cell stack.

2. Description of the Related Art

In general, a solid polymer electrolyte fuel cell includes a solid polymer electrolyte membrane, which is a polymer ion-exchange membrane. The fuel cell includes a membrane electrode assembly (MEA), in which an anode electrode is disposed on one surface of the solid polymer electrolyte membrane and a cathode electrode is disposed on the other surface of the solid polymer electrolyte membrane. The anode electrode and the cathode electrode each include a catalyst layer (electrode catalyst layer) and a gas diffusion layer (porous carbon).

The membrane electrode assembly and separators (bipolar plates) that sandwich the membrane electrode assembly constitute a power generation cell (unit fuel cell). A predetermined number of power generation cells are stacked and used, for example, as a vehicle fuel cell stack.

In the fuel cell stack, the temperatures of some of the power generation cells tend to decrease more easily than those of other power generation cells due to dissipation of heat to the outside. For example, the temperature of a power generation cell that is disposed at an end in the stacking direction (hereinafter, referred to as an "end power generation cell") decreases particularly easily, because heat of the end power generation cell is dissipated to the outside through a terminal plate, an end plate, and the like, which are adjacent to the end power generation cell.

For example, Japanese Unexamined Patent Application Publication No. 2001-68141 describes a fuel cell stack for solving this problem. Referring to FIG. 6, the fuel cell includes a stacked body 2 in which a plurality of cell units 1 are stacked. A pair of collector plates 3a and 3b are disposed at both ends of the stacked body 2 in the stacking direction. A pair of insulation plates 4a and 4b, for electrical insulation, are respectively disposed outside of the collector plates 3a and 3b.

Manifold plates 5a and 5b are respectively disposed outside of the insulation plates 4a and 4b. The manifold plates 5a and 5b apply a fastening force to the entirety of the fuel cell.

Each of the cell units 1 has a cooling water channel 6, extending in a direction along an electrode surface. An inlet and an outlet of the cooling water channel 6 are respectively connected to a cooling water supply manifold 7a and a water-guide manifold 7b.

The manifold plate 5a has a cooling water inlet 8a and a cooling water outlet 8b. The cooling water inlet 8a is connected to the cooling water supply manifold 7a, which extends in the stacking direction. The cooling water outlet 8b is connected to the water-guide manifold 7b via a cooling water channel 9, which is formed in the manifold plate 5b so as to make a vertical U-turn.

SUMMARY

According to one aspect of the present invention, a fuel cell stack includes a stacked body in which a plurality of power generation cells are stacked in a stacking direction, each of the power generation cells including an electrolyte electrode assembly and a separator, the electrolyte electrode assembly including an electrolyte and electrodes disposed on both sides of the electrolyte; and terminal plates, insulation members, and end plates that are disposed on both sides of the stacked body in the stacking direction.

The fuel cell stack includes a coolant channel through which a coolant flows in a direction along an electrode surface; and a coolant manifold that is connected to the coolant channel and through which the coolant flows in the stacking direction. The coolant manifold includes a first coolant inlet manifold and a second coolant inlet manifold that are independent from each other, and a first coolant outlet manifold and a second coolant outlet manifold that are independent from each other.

A coolant passage is formed between each of the insulation members and a corresponding one of the end plates, the coolant passage allowing the coolant to flow in a direction along a plate surface of the end plate. The coolant passage includes a first coolant passage connected to the first coolant inlet manifold and to the first coolant outlet manifold, and a second coolant passage connected to the second coolant inlet manifold and to the second coolant outlet manifold.

A surface area of a region in which the first coolant passage is formed is larger than a surface area of a region in which the second coolant passage is formed. A flow rate of the coolant flowing through the first coolant passage is larger than a flow rate of the coolant flowing through the second coolant passage.

According to another aspect of the present invention, a fuel cell stack includes a stacked body, insulation members, end plates, a coolant channel, a coolant manifold, and a coolant passage. The stacked body includes a plurality of power generation cells stacked in a stacking direction. Each of the power generation cells includes an electrolyte electrode assembly and separators. The electrolyte electrode assembly includes an electrolyte and electrodes sandwiching the electrolyte therebetween in the stacking direction. The separators sandwich the electrolyte electrode assembly therebetween in the stacking direction. The insulation members are provided to sandwich the stacked body therebetween in the stacking direction. The end plates are provided to sandwich the stacked body with the insulation members therebetween in the stacking direction. A coolant flows in a direction along an electrode surface through the coolant channel. The coolant manifold is connected to the coolant channel. The coolant flows in the stacking direction through the coolant manifold. The coolant manifold includes a first coolant inlet manifold, a second coolant inlet manifold, a first coolant outlet manifold, and a second coolant outlet manifold. The coolant passage is provided between each of the insulation members and each of the end plates. The coolant flows in a direction along a plate surface of the end plate through the coolant passage. The coolant passage includes a first coolant passage and a second coolant passage. The first coolant passage is connected to the first coolant inlet manifold and to the first coolant outlet manifold. The second coolant passage is connected to the second coolant inlet manifold and to the second coolant outlet manifold. A surface area of a region in which the first coolant passage is provided is larger than a surface area of a region in which the second coolant passage is provided. A flow rate of the coolant flowing through the first coolant passage is larger than a flow rate of the coolant flowing through the second coolant passage.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

DESCRIPTION OF THE EMBODIMENTS

Figure 1:
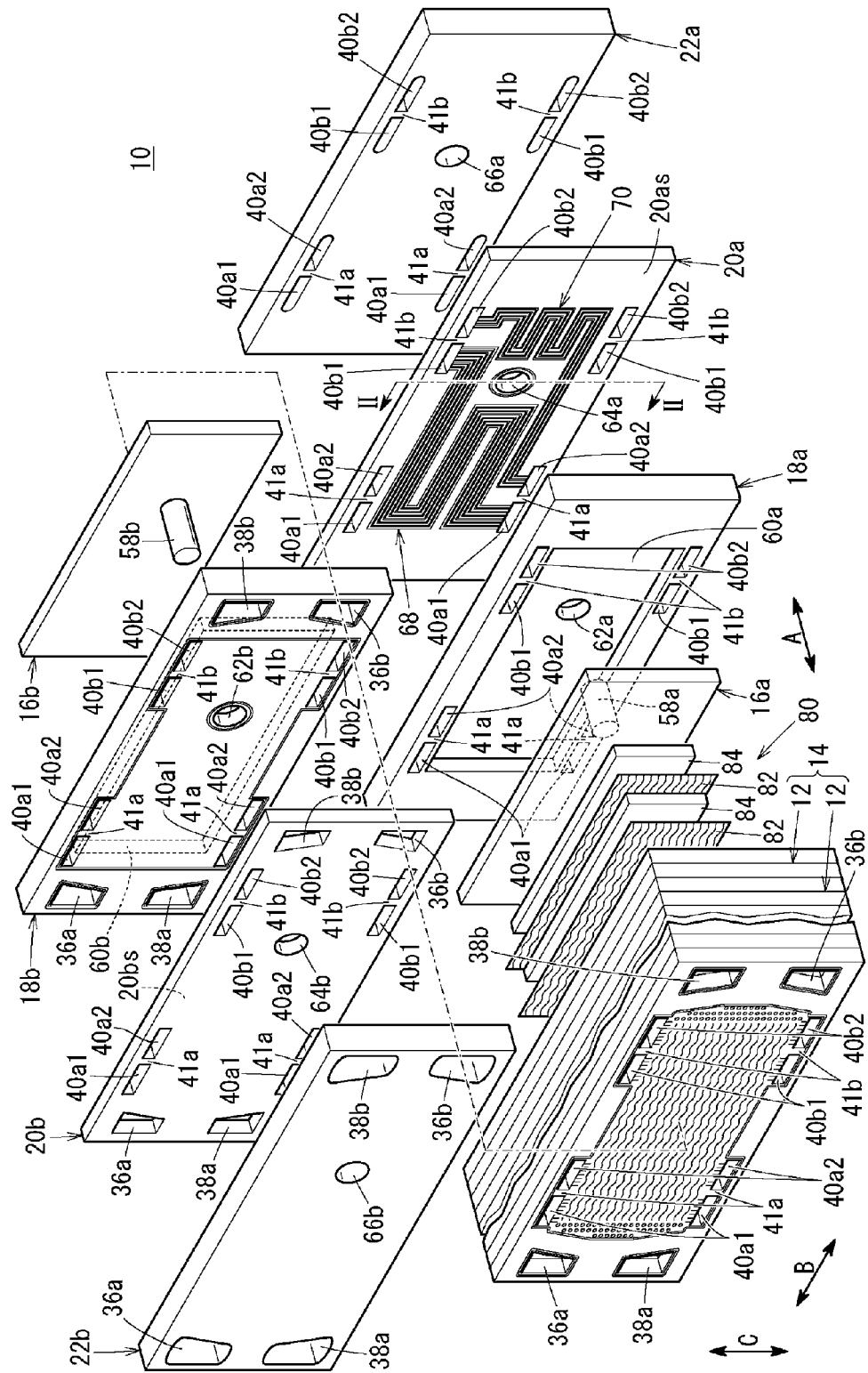
FIG. 1 is an exploded perspective view of a fuel cell stack according to an embodiment of the present disclosure.

The embodiments will now be described with reference to the accompanying drawings, wherein like reference numerals designate corresponding or identical elements throughout the various drawings.

Referring to FIG. 1, a fuel cell stack 10 according to an embodiment of the present disclosure includes a stacked body 14 in which a plurality of power generation cells 12 are stacked in a horizontal direction (direction of arrow A), or in a vertical direction (direction of arrow C). The fuel cell stack 10 is used, for example, for a fuel cell electric automobile (not shown) as a vehicle fuel cell stack.

Figure 2:
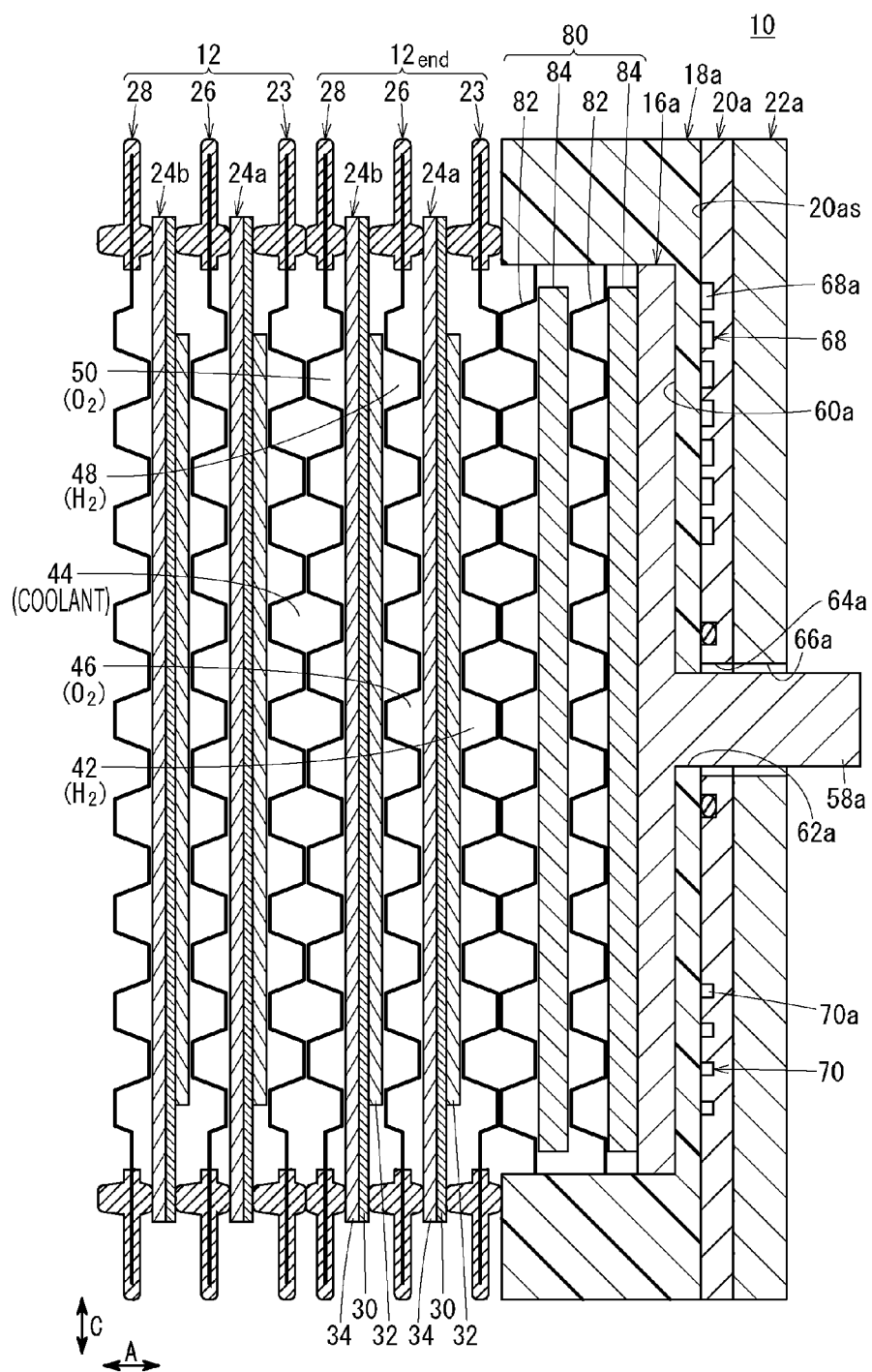
FIG. 2 is a sectional view of the fuel cell stack taken along line II-II of FIG. 1.

Referring to FIGS. 1 and 2, at one end of the stacked body 14 in the stacking direction (direction of arrow A), a terminal plate 16a, an insulation member 18a, a channel plate 20a, and an end plate 22a are arranged outward. Referring to FIG. 1, at the other end of the stacked body 14 in the stacking direction, a terminal plate 16b, an insulation member 18b, a channel plate 20b, and an end plate 22b are arranged outward.

The fuel cell stack 10 is integrally held by a box-shaped casing (not shown) that has the end plates 22a and 22b (having, for example, rectangular shapes) as end panels thereof. The fuel cell stack 10 may be integrally fastened and held by using a plurality of tie-rods (not shown) extending, for example, in the direction of arrow A.

Figure 3:
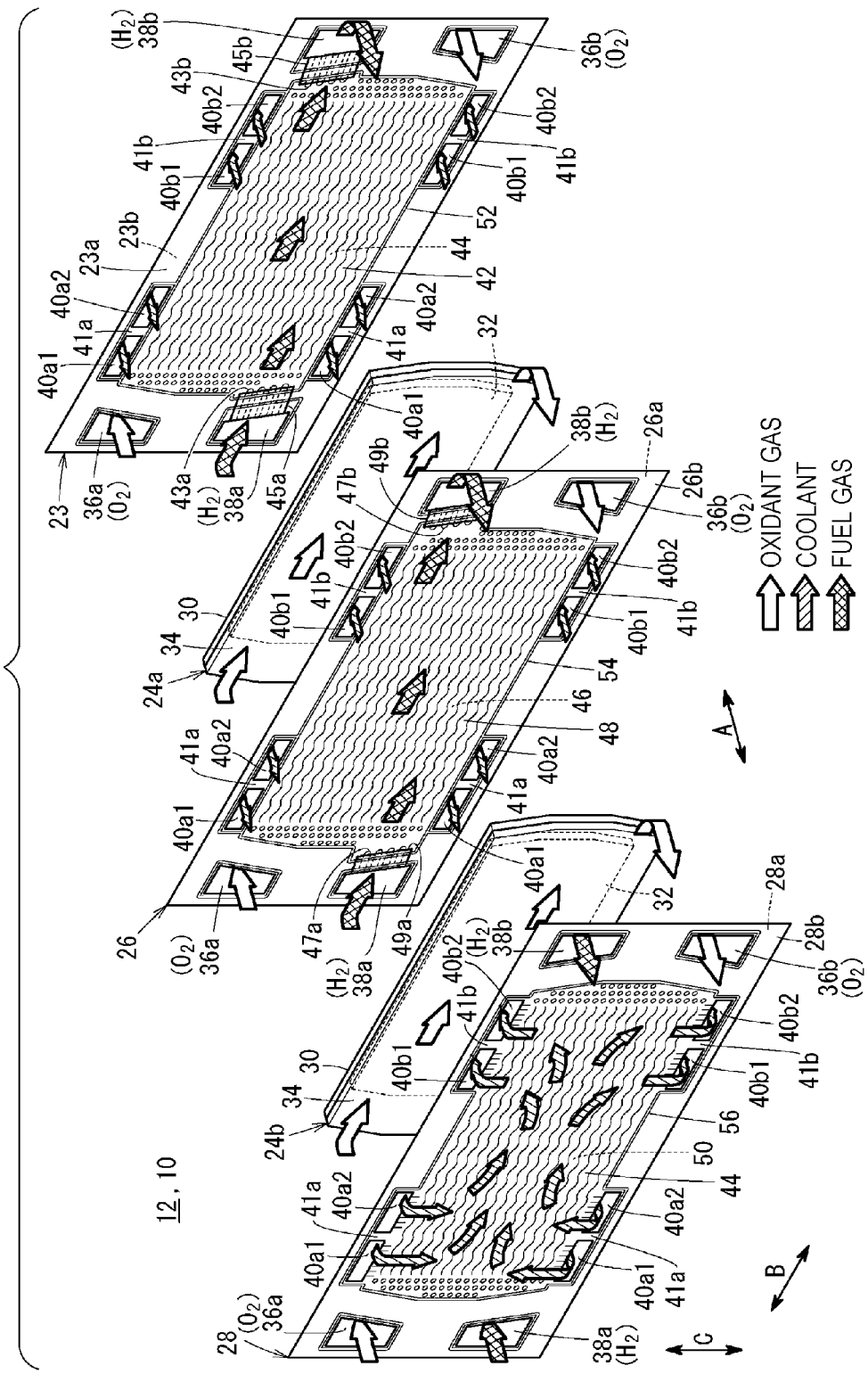
FIG. 3 is an exploded perspective view of a power generation cell included in the fuel cell stack.

Referring to FIGS. 2 and 3, each of the power generation cells 12 includes a first metal separator 23, a first membrane electrode assembly (electrolyte-electrode assembly) (MEA) 24a, a second metal separator 26, a second membrane electrode assembly (MEA) 24b, and a third metal separator 28. The first metal separator 23, the second metal separator 26, and the third metal separator 28 are each made from a horizontally-elongated metal plate, such as a steel plate, a stainless steel plate, an aluminum plate, or a galvanized steel plate.

Carbon separators may be used instead of the first metal separator 23, the second metal separator 26, and the third metal separator 28. The power generation cell 12 may have only one MEA, and the MEA may be sandwiched between a first separator and a second separator.

Referring to FIG. 2, the first membrane electrode assembly 24a and the second membrane electrode assembly 24b each include a solid polymer electrolyte membrane 30, which is, for example, a thin film that is made of a perfluorosulfonic acid polymer and soaked with water. The solid polymer electrolyte membrane 30 is sandwiched between an anode electrode 32 and a cathode electrode 34. Each of the first membrane electrode assembly 24a and the second membrane electrode assembly 24b is a stepped MEA in which the planer dimensions of the anode electrode 32 are smaller than those of the cathode electrode 34. Alternatively, the anode electrode 32 may have planer dimensions larger than those of the cathode electrode 34. The anode electrode 32 and the cathode electrode 34 may have the same planar dimensions.

The anode electrode 32 and the cathode electrode 34 each include a gas diffusion layer (not shown) and an electrode catalyst layer (not shown). The gas diffusion layer is made of carbon paper or the like. The electrode catalyst layer is formed by uniformly coating a surface of the gas diffusion layer with porous carbon particles whose surfaces support a platinum alloy. The electrode catalyst layers are formed on both sides of the solid polymer electrolyte membrane 30.

Referring to FIG. 3, an oxidant gas inlet manifold 36a and a fuel gas inlet manifold 38a are disposed in the power generation cell 12 so as to extend in the stacking direction (the direction of arrow A) through one end portion of the power generation cell 12 in the longitudinal direction (direction of arrow B) (horizontal direction). An oxidant gas, such as an oxygen-containing gas, is supplied through the oxidant gas inlet manifold 36a. A fuel gas, such as a hydrogen-containing gas, is supplied through the fuel gas inlet manifold 38a.

A fuel gas outlet manifold 38b and an oxidant gas outlet manifold 36b are disposed in the power generation cell 12 so as to extend in the direction of arrow A through the other end portion of the power generation cell 12 in the longitudinal direction (direction of arrow B). The fuel gas is discharged through the fuel gas outlet manifold 38b. The oxidant gas is discharged through the oxidant gas outlet manifold 36b.

Two pairs of coolant inlet manifolds 40a1 and 40a2 are disposed in the power generation cell 12 so as to extend in the direction of arrow A through two end portions (that are near the oxidant gas inlet manifold 36a) of the power generation cell 12 in the transversal direction (direction of arrow C) (vertical direction). A coolant is supplied through the coolant inlet manifolds 40a1 and 40a2. The coolant inlet manifolds 40a1 and 40a2 each have a horizontally elongated rectangular opening. Each pair of the coolant inlet manifolds 40a1 and 40a2 are independently formed so as to be separated from each other by providing a rib portion 41a between the coolant inlet manifolds 40a1 and 40a2.

Two pairs of coolant outlet manifolds 40b1 and 40b2 are disposed in the power generation cell 12 so as to extend in the direction of arrow A through two end portions (that are near the oxidant gas outlet manifold 36b) of the power generation cell 12 in the transversal direction. The coolant is discharged through the coolant outlet manifolds 40b1 and 40b2. The coolant outlet manifolds 40b1 and 40b2 each have a horizontally elongated rectangular opening. Each pair of the coolant outlet manifolds 40b1 and 40b2 are independently formed so as to be separated from each other by providing a rib portion 41b between the coolant outlet manifolds 40b1 and 40b2. The fuel gas inlet manifold 38a and the fuel gas outlet manifold 38b may be interchanged with each other.

A first fuel gas channel 42, which is connected to the fuel gas inlet manifold 38a and the fuel gas outlet manifold 38b, is formed on a surface 23a of the first metal separator 23 facing the first membrane electrode assembly 24a. The first fuel gas channel 42 includes a plurality of wave-shaped or linear channel grooves.

The fuel gas inlet manifold 38a and the first fuel gas channel 42 are connected to each other through a plurality of inlet connection channels 43a. The fuel gas outlet manifold 38b and the first fuel gas channel 42 are connected to each other through a plurality of outlet connection channels 43b. The inlet connection channels 43a and the outlet connection channels 43b are respectively covered by a cover member 45a and a cover member 45b. A part of a coolant channel 44 is formed a surface 23b of the first metal separator 23. The coolant channel 44 connects the two pairs of coolant inlet manifolds 40a1 and 40a2 and the two pairs of coolant outlet manifolds 40b1 and 40b2 to each other.

A first oxidant gas channel 46, which is connected to the oxidant gas inlet manifold 36a and the oxidant gas outlet manifold 36b, is formed on a surface 26a of the second metal separator 26 facing the first membrane electrode assembly 24a. The first oxidant gas channel 46 includes a plurality of wave-shaped or linear channel grooves.

A second fuel gas channel 48, which is connected to the fuel gas inlet manifold 38a and the fuel gas outlet manifold 38b, is formed on a surface 26b of the second metal separator 26 facing the second membrane electrode assembly 24b. The second fuel gas channel 48 includes a plurality of wave-shaped or linear channel grooves.

The fuel gas inlet manifold 38a and the second fuel gas channel 48 are connected to each other through a plurality of inlet connection channels 47a. The fuel gas outlet manifold 38b and the second fuel gas channel 48 are connected to each other through a plurality of outlet connection channels 47b. The inlet connection channels 47a and the outlet connection channels 47b are respectively covered by a cover member 49a and a cover member 49b.

A second oxidant gas channel 50, which is connected to the oxidant gas inlet manifold 36a and the oxidant gas outlet manifold 36b, is formed on a surface 28a of the third metal separator 28 facing the second membrane electrode assembly 24b. The second oxidant gas channel 50 includes a plurality of wave-shaped or linear channel grooves. A part of the coolant channel 44 is formed a surface 28b of the third metal separator 28.

A first sealing member 52 is integrally formed on the surfaces 23a and 23b of the first metal separator 23 so as to surround the outer peripheral end portion of the first metal separator 23. A second sealing member 54 is integrally formed on the surfaces 26a and 26b of the second metal separator 26 so as to surround the outer peripheral end portion of the second metal separator 26. A third sealing member 56 is integrally formed on the surfaces 28a and 28b of the third metal separator 28 so as to surround the outer peripheral end portion of the third metal separator 28.

The first sealing member 52, the second sealing member 54, and the third sealing member 56 are each made of an elastic material, such as a sealing material, a cushioning material, or a packing material. Examples of such materials include EPDM, NBR, fluorocarbon rubber, silicone rubber, fluorosilicone rubber, butyl rubber, natural rubber, styrene rubber, chloroprene rubber, and acrylic rubber.

Referring to FIG. 1, electric power output terminals 58a and 58b, which extend outward in the stacking direction, are respectively disposed at positions separated from the centers of the surfaces of the terminal plates 16a and 16b. Prefer-ably, the electric power output terminals 58a and 58b are disposed at positions closer to coolant outlet manifolds 40b1 and 40b2 of the coolant channel 44 than to the coolant inlet manifolds 40a1 and 40a2.

The insulation members 18a and 18b are each made of an electrically-insulating material, such as polycarbonate (PC) or a phenol resin. A recessed portion 60a, which has a rectangular shape, is formed in a central part of a surface of the insulation member 18a facing the terminal plate 16a. A hole 62a is formed in the insulation member 18a so as to be connected to the recessed portion 60a. The electric power output terminal 58a of the terminal plate 16a extends through the hole 62a in the insulation member 18a, a hole 64a in the channel plate 20a, and a hole 66a in the end plate 22a, and is exposed to the outside.

A recessed portion 60b, which has a rectangular shape, is formed in a central part of a surface of the insulation member 18b facing the terminal plate 16b. A hole 62b is formed in the insulation member 18b so as to be connected to the recessed portion 60b. The electric power output terminal 58b of the terminal plate 16b extends through the hole 62b, a hole 64b in the channel plate 20b, and a hole 66b in the end plate 22b, and is exposed to the outside.

The two pairs of coolant inlet manifolds 40a1 and 40a2 and the two pairs of coolant outlet manifolds 40b1 and 40b2 are formed in the insulation members 18a and 18b, the channel plates 20a and 20b, and the end plate 22a. The oxidant gas inlet manifold 36a, the oxidant gas outlet manifold 36b, the fuel gas inlet manifold 38a, and the fuel gas outlet manifold 38b are formed in the insulation member 18b, the channel plate 20b, and the end plate 22b.

Figure 4:
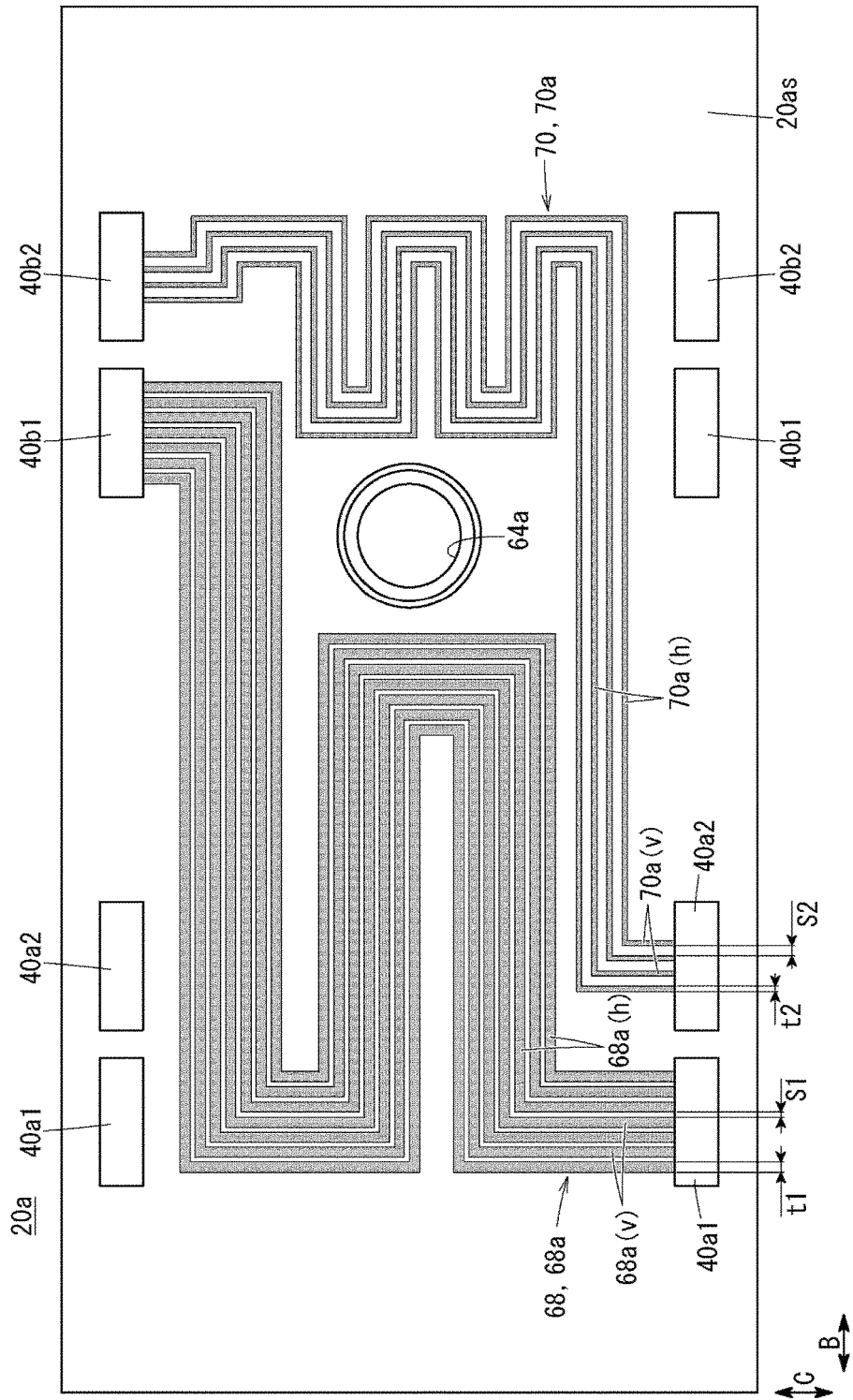
FIG. 4 is a plan view of one of channel plates of the fuel cell stack.

Referring to FIGS. 1 and 4, a coolant passage is formed on a surface 20as of the channel plate 20a facing the insulation member 18a. A coolant flows through the coolant passage in a direction along a plate surface of the end plate 22a.

The coolant passage includes a first coolant passage 68, which is connected to the coolant inlet manifold 40a1 (first coolant inlet manifold) disposed below the coolant passage and to the coolant outlet manifold 40b1 (first coolant outlet manifold) disposed above the coolant passage. The coolant passage includes a second coolant passage 70, which is connected to the coolant inlet manifold 40a2 (second coolant inlet manifold) disposed below the coolant passage and to the coolant outlet manifold 40b2 (second coolant outlet manifold) disposed above the coolant passage.

The first coolant passage 68 includes a plurality of (for example, seven) first coolant passage grooves 68a. The first coolant passage grooves 68a are serpentine passage grooves (having meandering shapes) whose inlets are connected to the coolant inlet manifold 40a1 and whose outlets are connected to the coolant outlet manifold 40b1. Each of the first coolant passage grooves 68a has a portion 68a(v), through which the coolant flows upward, and a portion 68a(h), through which the coolant flows in a horizontal direction. The portion 68a(v) and the portion 68a(h) are alternately arranged.

The second coolant passage 70 includes a plurality of (for example, four) second coolant passage grooves 70a. The second coolant passage grooves 70a are serpentine passage grooves (having meandering shapes) whose inlets are connected to the coolant inlet manifold 40a2 and whose outlets are connected to the coolant outlet manifold 40b2. Each of the second coolant passage grooves 70a has a portion 70a(v), through which the coolant flows upward, and a portion 70a(h), through which the coolant flows in a horizontal direction. The portion 70a(v) and the portion 70a(h) are alternately arranged.

In the surface 20as of the channel plate 20a, the surface area of a region in which the first coolant passage 68 is formed is larger than the surface area of a region in which the second coolant passage 70 is formed. In other words, in the surface 20as, the first coolant passage 68 has a larger surface area than the second coolant passage 70. The flow rate of the coolant flowing through the first coolant passage 68 is larger than the flow rate of coolant flowing through the second coolant passage 70.

The width t1 of each of the first coolant passage grooves 68a is larger than the width t2 of each of the second coolant passage grooves 70a (t1>t2). The distance (rib distance) S1 between adjacent first coolant passage grooves 68a is smaller than the distance (rib distance) S2 between adjacent second coolant passage grooves 70a (S1<S2). The depth of the first coolant passage 68 may be larger than the depth of the second coolant passage 70.

The cross-sectional area of each of the first coolant passage grooves 68a and the cross-sectional area of each of the second coolant passage grooves 70a differ from each other. To be specific, the cross-sectional area of the first coolant passage groove 68a is larger than the cross-sectional area of the second coolant passage groove 70a.

Figure 5:
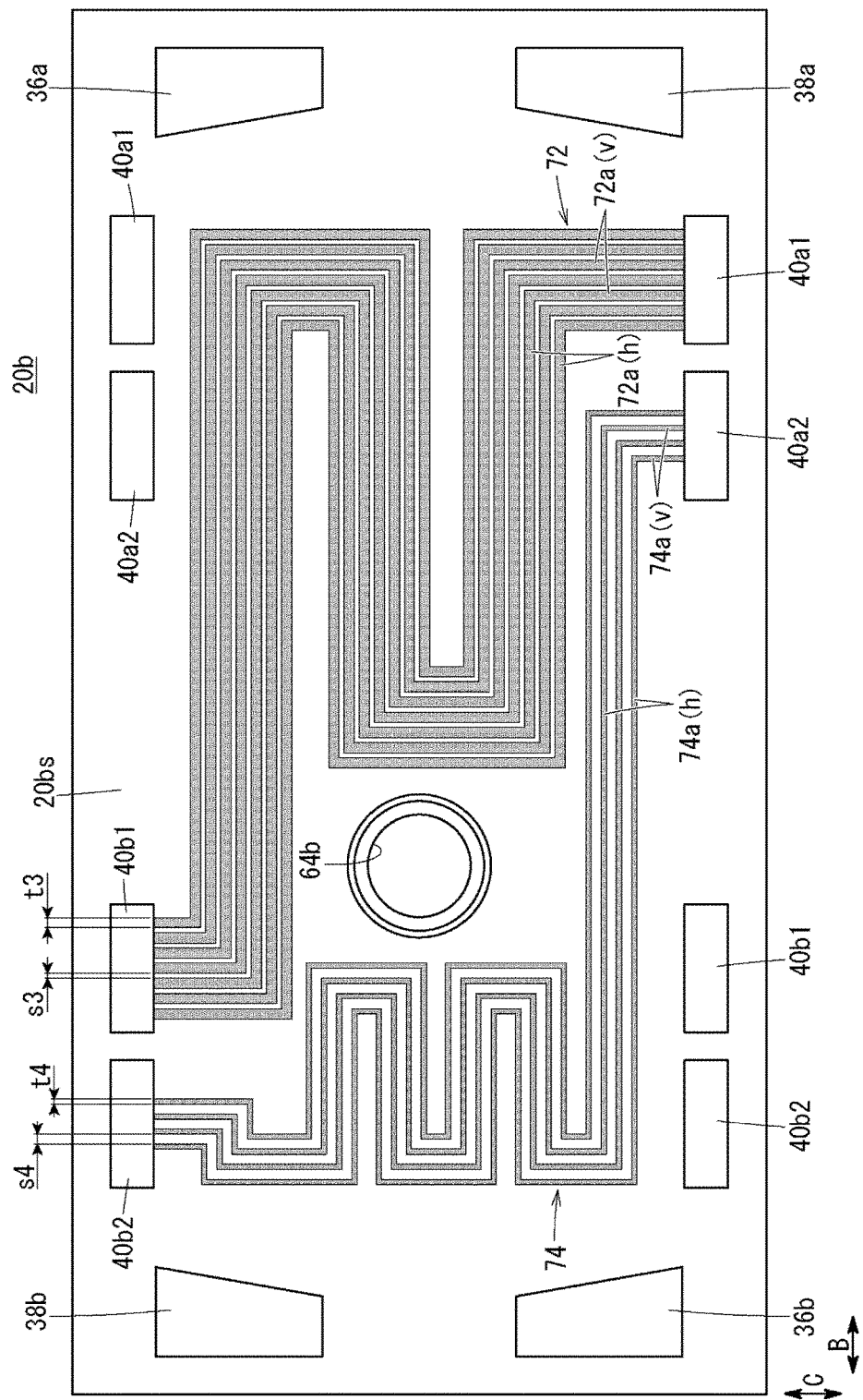
FIG. 5 is a plan view of the other channel plate of the fuel cell stack.
Figure 6:
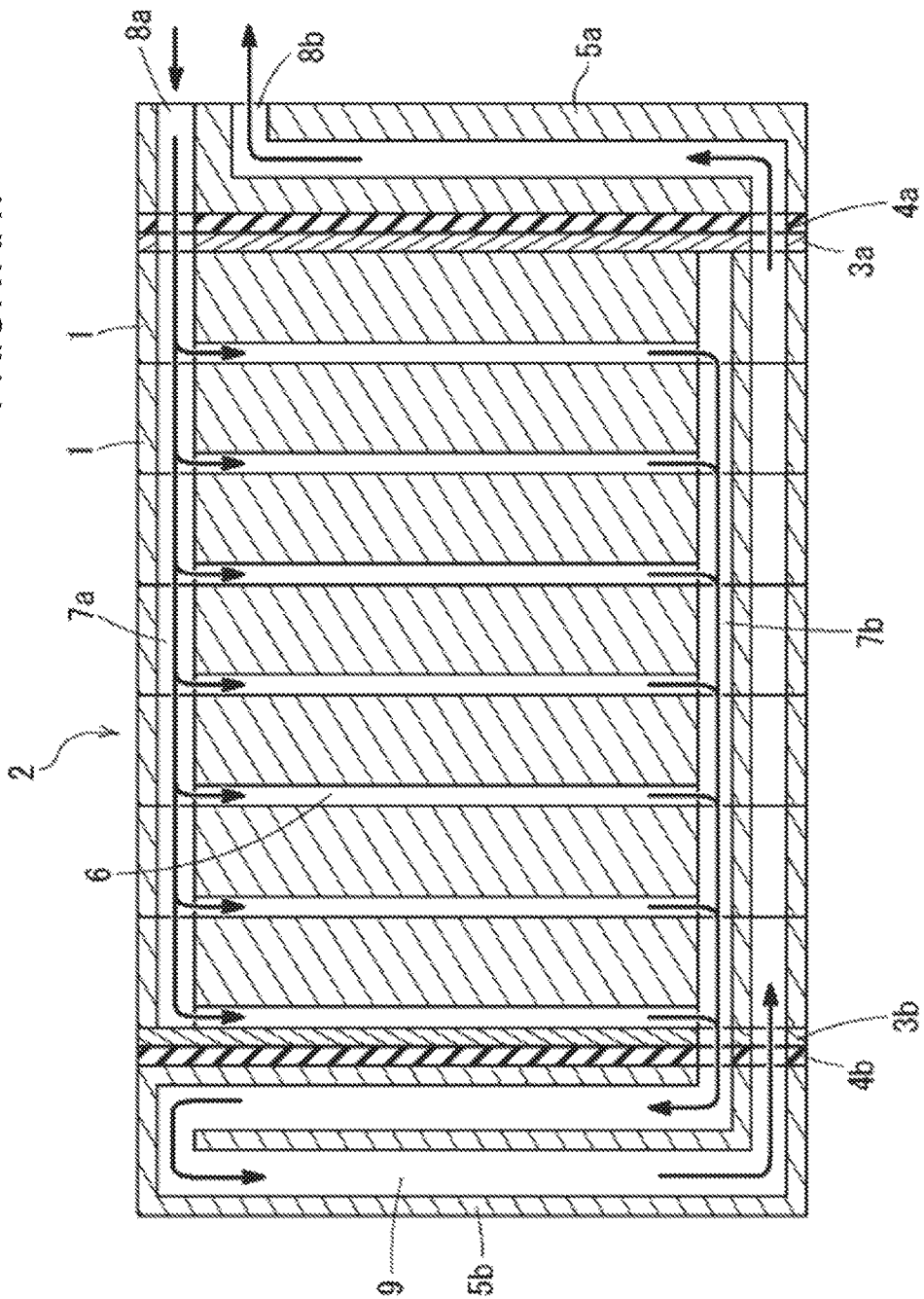
FIG. 6 is a schematic view of a fuel cell disclosed in Japanese Unexamined Patent Application Publication No. 2001-68141.

Referring to FIG. 5, a coolant passage is formed on a surface 20bs of the channel plate 20b facing the insulation member 18b. The coolant flows through the coolant passage in a direction along a plate surface of the end plate 22b.

The coolant passage includes a first coolant passage 72, which us connected to the coolant inlet manifold 40a1 (first coolant inlet manifold) disposed below the coolant passage and to the coolant outlet manifold 40b1 (first coolant outlet manifold) disposed above the coolant passage. The coolant passage includes a second coolant passage 74, which is connected to the coolant inlet manifold 40a2 (second coolant inlet manifold) disposed below the coolant passage and to the coolant outlet manifold 40b2 (second coolant outlet manifold) disposed above the coolant passage.

The first coolant passage 72 includes a plurality of (for example, seven) first coolant passage grooves 72a. The first coolant passage grooves 72a are serpentine passage grooves (having meandering shapes) whose inlets are connected to the coolant inlet manifold 40a1 and whose outlets are connected to the coolant outlet manifold 40b1. Each of the first coolant passage grooves 72a only has a portion 72a(v), through which the coolant flows upward, and a portion 72a(h), through which the coolant flows in a horizontal direction. The portion 72a(v) and the portion 72a(h) are alternately arranged.

The second coolant passage 74 includes a plurality of (for example, four) second coolant passage grooves 74a. The second coolant passage grooves 74a are serpentine passage grooves (having meandering shapes) whose inlets are connected to the coolant inlet manifold 40a2 and whose outlets are connected to the coolant outlet manifold 40b2. Each of the second coolant passage grooves 74a only has a portion 74a(v), through which the coolant flows upward, and a portion 74a(h), through which the coolant flows in a horizontal direction. The portion 74a(v) and the portion 74a(h) are alternately arranged.

In the surface 20bs of the channel plate 20b, the surface area of a region in which the first coolant passage 72 is formed is larger than the surface area of a region in which the second coolant passage 74 is formed. In other words, in the surface 20bs, the first coolant passage 72 has a larger surface area than the second coolant passage 74. The flow rate of the coolant flowing through the first coolant passage 72 is larger than the flow rate of coolant flowing through the second coolant passage 74.

The width t3 of each of the first coolant passage grooves 72a is larger than the width t4 of each of the second coolant passage grooves 74a (t3>t4). The distance (rib distance) s3 between adjacent first coolant passage grooves 72a is smaller than the distance (rib distance) s4 between adjacent second coolant passage grooves 74a (s3<s4). The depth of the first coolant passage 72 may be larger than the depth of the second coolant passage 74.

The cross-sectional area of each of the first coolant passage grooves 72a and the cross-sectional area of each of the second coolant passage grooves 74a differ from each other. To be specific, the cross-sectional area of the first coolant passage groove 72a is larger than the cross-sectional area of the second coolant passage groove 74a.

Referring to FIGS. 1 and 2, a heat-insulating member 80 and the terminal plate 16a are accommodated in the recessed portion 60a of the insulation member 18a. The heat-insulating member 80 includes, for example, first heat-insulating members 82 and second heat-insulating members 84, which are made of different materials. The first heat-insulating members 82 and the second heat-insulating members 84 are alternately stacked. The first heat-insulating members 82 are made from, for example, metal plates; and the second heat-insulating members 84 are made from, for example, porous carbon plates. Although not illustrated, a heat-insulating member 80 and a terminal plate 16b are accommodated in the recessed portion 60b of the insulation member 18b in the same manner.

Alternatively, the heat-insulating member 80 may include, for example, two sets (or three sets) of two types of wave-shaped metal plates that are alternately stacked. The heat-insulating member 80 may be any member having air voids and having electrical conductivity. Examples of the material of the heat-insulating member 80 includes a metal foam, a honeycomb metal (honeycomb member), or porous carbon (for example, carbon paper), each of which having electrical conductivity. The number of the heat-insulating member 80 may be one, or, a plurality of heat-insulating members 80 may be stacked.

An operation of the fuel cell stack 10, which is structured as described above, will be described.

Referring to FIG. 1, an oxidant gas, such as an oxygen-containing gas, is supplied to the oxidant gas inlet manifold 36a of the end plate 22b. A fuel gas, such as a hydrogen-containing gas, is supplied to the fuel gas inlet manifold 38a of the end plate 22b. A coolant, such as pure water, ethylene glycol, an oil, or the like, is supplied to each pair of coolant inlet manifolds 40a1 and 40a2 of the end plate 22a.

Referring to FIG. 3, the oxidant gas flows into the first oxidant gas channel 46 of the second metal separator 26 and the second oxidant gas channel 50 of the third metal separator 28 from the oxidant gas inlet manifold 36a. The oxidant gas is supplied to the cathode electrodes 34 of the first membrane electrode assembly 24a and the second membrane electrode assembly 24b while flowing in the direction of arrow B.

The fuel gas flows into the first fuel gas channel 42 of the first metal separator 23 and the second fuel gas channel 48 of the second metal separator 26 from the fuel gas inlet manifold 38a. The fuel gas is supplied to the anode electrodes 32 of the first membrane electrode assembly 24a and the second membrane electrode assembly 24b while flowing along the first fuel gas channel 42 and the second fuel gas channel 48 in the direction of arrow B.

Accordingly, in the first membrane electrode assembly 24a and the second membrane electrode assembly 24b, the oxidant gas supplied to the cathode electrodes 34 and the fuel gas supplied to the anode electrodes 32 cause electrochemical reactions in the electrode catalyst layers, and thereby electric power is generated.

The oxidant gas, which has been supplied to the cathode electrodes 34 and consumed, is discharged along the oxidant gas outlet manifold 36b in the direction of arrow A. Likewise, the fuel gas, which has been supplied to the anode electrodes 32 and consumed, is discharged along the fuel gas outlet manifold 38b in the direction of arrow A.

Referring to FIG. 3, the coolant, which has been supplied to the coolant inlet manifolds 40a1 and 40a2, flows into the coolant channel 44 between the first metal separator 23 of the power generation cell 12 and the third metal separator 28 of an adjacent power generation cell 12. A part of the coolant supplied to one of the pairs coolant inlet manifolds 40a1 and 40a2 and a part of the coolant supplied to the other pair of coolant inlet manifolds 40a1 and 40a2 flow in the directions of arrow C so as to approach each other. Then, the coolant flows in the direction of arrow B (the longitudinal direction of the separators) and cools the first membrane electrode assembly 24a and the second membrane electrode assembly 24b. Next, the coolant flows in the directions of arrow C so as to be separated into parts and discharged from the two pairs of coolant outlet manifolds 40b1 and 40b2.

Referring to FIGS. 1 and 4 and other figures, in the present embodiment, the channel plate 20a has coolant passages. To be specific, the channel plate 20a has the first coolant passage 68, which is connected to the coolant inlet manifold 40a1 below the first coolant passage 68 and to the coolant outlet manifold 40b1 above the first coolant passage 68, and the second coolant passage 70, which is connected to the coolant inlet manifold 40a2 below the second coolant passage 70 and to the coolant outlet manifold 40b2 above the second coolant passage 70.

Referring to FIG. 4, in the surface 20as of the channel plate 20a, the surface area of a region in which the first coolant passage 68 is formed is larger than the surface area of a region in which the second coolant passage 70 is formed. In other words, in the surface 20as, the first coolant passage 68 has a larger surface area than the second coolant passage 70.

The first coolant passage 68 includes, for example, seven first coolant passage grooves 68a, and the second coolant passage 70 includes, for example, four second coolant passage grooves 70a. The width t1 of each of the first coolant passage grooves 68a is larger than the width t2 of each of the second coolant passage grooves 70a (t1>t2). Therefore, the flow rate of the coolant flowing through the first coolant passage 68 is larger than the flow rate of coolant flowing through the second coolant passage 70.

Accordingly, the flow rate of the coolant in the entirety of the coolant passage can be made uniform along the surface 20as of the channel plate 20a, and the destitution of temperature in an end portion of the fuel cell stack 10 can be made uniform.

Accordingly, with a simple structure, a decrease in the temperature of an end power generation cell $12_{end}$ (see FIG. 2), which is disposed at an end portion of the stacked body 14, can be reliably suppressed; and the temperature of the entirety of the end power generation cell $12_{end}$ can be maintained at a constant level. The channel plate 20b has the same function as the channel plate 20a. Thus, an advantage is obtained in that the entirety of the stacked body 14, that is, the entirety of the fuel cell stack 10 can have high power generation performance.

Referring to FIG. 4, in the channel plate 20a, each of the first coolant passage groove 68a only has the portion 68a(v), through which the coolant flows upward, and the portion 68a(h), through which the coolant flows in a horizontal direction. Therefore, each of the first coolant passage grooves 68a does not have a portion through which the coolant flows downward and then flows upward. Accordingly, in the first coolant passage grooves 68a, interruption of the flow of the coolant or forming of bubbles in the coolant can be suppressed, and high cooling efficiency can be maintained.

The second coolant passage grooves 70a, each of which is structured in the same way as the first coolant passage groove 68a, provide the same advantage. The channel plate 20b, which is structured in the same way as the channel plate 20a, provides the same advantage.

According to the present disclosure, a fuel cell stack includes a stacked body in which a plurality of power generation cells are stacked in a stacking direction, each of the power generation cells including an electrolyte electrode assembly and a separator, the electrolyte electrode assembly including an electrolyte and electrodes disposed on both sides of the electrolyte; and terminal plates, insulation members, and end plates that are disposed on both sides of the stacked body in the stacking direction.

The fuel cell stack includes a coolant channel through which a coolant flows in a direction along an electrode surface; and a coolant manifold that is connected to the coolant channel and through which the coolant flows in the stacking direction. The coolant manifold includes a first coolant inlet manifold and a second coolant inlet manifold that are independent from each other, and a first coolant outlet manifold and a second coolant outlet manifold that are independent from each other.

A coolant passage is formed between each of the insulation members and a corresponding one of the end plates, the coolant passage allowing the coolant to flow in a direction along a plate surface of the end plate. The coolant passage includes a first coolant passage connected to the first coolant inlet manifold and to the first coolant outlet manifold, and a second coolant passage connected to the second coolant inlet manifold and to the second coolant outlet manifold.

A surface area of a region in which the first coolant passage is formed is larger than a surface area of a region in which the second coolant passage is formed. A flow rate of the coolant flowing through the first coolant passage is larger than a flow rate of the coolant flowing through the second coolant passage.

In the fuel cell stack, preferably, an electric power output terminal is disposed on each of the terminal plates, and the electric power output terminal is located between the first coolant passage and the second coolant passage.

In the fuel cell stack, preferably, end plate has a rectangular shape, and the electric power output terminal is located so as to be offset in a longitudinal direction of the end plate.

In the fuel cell stack, preferably, a cross-sectional area of the first coolant passage and a cross-sectional area of the second coolant passage differ from each other.

In the fuel cell stack, preferably, a length of the first coolant passage and a length of the second coolant passage differ from each other.

In the fuel cell stack, preferably, each of the first coolant passage and the second coolant passage has a meandering shape.

In the fuel cell stack, preferably, each of the first coolant passage and the second coolant passage only includes a portion in which the coolant flows upward and a portion in which the coolant flows in a horizontal direction.

With the present disclosure, the surface area of a region in which the first coolant passage is formed is larger than the surface area of a region in which the second coolant passage is formed. The flow rate of the coolant flowing through the first coolant passage is larger than the flow rate of the coolant flowing through the second coolant passage. Therefore, the flow rate of the coolant in the entirety of the coolant passage can be made uniform along a surface, and the distribution of temperature in an end portion of the fuel cell stack can be made uniform.

Accordingly, with a simple structure, a decrease in the temperature of an end power generation cell, which is disposed in an end portion of the stacked body, can be reliably suppressed; the temperature of the entirety of the end power generation cell can be maintained at a constant level; and high power generation performance can be maintained.

Obviously, numerous modifications and variations of the present invention are possible in light of the above teachings. It is therefore to be understood that within the scope of the appended claims, the invention may be practiced otherwise than as specifically described herein.

What is claimed is:

1. A fuel cell stack comprising:
    a stacked body in which a plurality of power generation cells are stacked in a stacking direction, each of the power generation cells including an electrolyte electrode assembly and a separator, the electrolyte electrode assembly including an electrolyte and electrodes disposed on both sides of the electrolyte;
    terminal plates, insulation members, and end plates that are disposed on both sides of the stacked body in the stacking direction;
    a coolant channel through which a coolant flows in a direction along an electrode surface; and
    a coolant manifold that is connected to the coolant channel and through which the coolant flows in the stacking direction,
    wherein the coolant manifold includes
        a first coolant inlet manifold and a second coolant inlet manifold that are independent from each other, and
        a first coolant outlet manifold and a second coolant outlet manifold that are independent from each other,
    wherein a coolant passage is formed between each of the insulation members and a corresponding one of the end plates, the coolant passage allowing the coolant to flow in a direction along a plate surface of the end plate,
    wherein the coolant passage includes
        a first coolant passage connected to the first coolant inlet manifold and to the first coolant outlet manifold, and
        a second coolant passage connected to the second coolant inlet manifold and to the second coolant outlet manifold, and
    wherein a surface area of a region in which the first coolant passage is formed is larger than a surface area of a region in which the second coolant passage is formed, and a flow rate of the coolant flowing through the first coolant passage is larger than a flow rate of the coolant flowing through the second coolant passage.

2. The fuel cell stack according to claim 1,
wherein an electric power output terminal is disposed on each of the terminal plates, and
wherein the electric power output terminal is located between the first coolant passage and the second coolant passage.

3. The fuel cell stack according to claim 2,
wherein the end plate has a rectangular shape, and
wherein the electric power output terminal is located so as to be offset in a longitudinal direction of the end plate.

4. The fuel cell stack according to claim 1,
wherein a cross-sectional area of the first coolant passage and a cross-sectional area of the second coolant passage differ from each other.

5. The fuel cell stack according to claim 1,
wherein a length of the first coolant passage and a length of the second coolant passage differ from each other.

6. The fuel cell stack according to claim 1,
wherein each of the first coolant passage and the second coolant passage has a meandering shape.

7. The fuel cell stack according to claim 6,
wherein each of the first coolant passage and the second coolant passage only includes a portion in which the coolant flows upward and a portion in which the coolant flows in a horizontal direction.

8. A fuel cell stack comprising:
    a stacked body comprising:
        a plurality of power generation cells stacked in a stacking direction, each of the power generation cells comprising:
            an electrolyte electrode assembly including an electrolyte and electrodes sandwiching the electrolyte therebetween in the stacking direction; and
            separators sandwiching the electrolyte electrode assembly therebetween in the stacking direction;
    insulation members provided to sandwich the stacked body therebetween in the stacking direction;
    end plates provided to sandwich the stacked body with the insulation members therebetween in the stacking direction;
    a coolant channel through which a coolant flows in a direction along an electrode surface;
    a coolant manifold that is connected to the coolant channel and through which the coolant flows in the stacking direction, the coolant manifold comprising:
        a first coolant inlet manifold;
        a second coolant inlet manifold;
        a first coolant outlet manifold; and
        a second coolant outlet manifold;
    a coolant passage which is provided between each of the insulation members and each of the end plates and through which the coolant flows in a direction along a plate surface of the end plate, the coolant passage comprising:
        a first coolant passage connected to the first coolant inlet manifold and to the first coolant outlet manifold; and
        a second coolant passage connected to the second coolant inlet manifold and to the second coolant outlet manifold, a surface area of a region in which the first coolant passage is provided being larger than a surface area of a region in which the second coolant passage is provided, a flow rate of the coolant flowing through the first coolant passage being larger than a flow rate of the coolant flowing through the second coolant passage.

9. The fuel cell stack according to claim 8, further comprising:

terminal plates provided to sandwich the stacked body with the insulation members and the end plates therebetween in the stacking direction.

10. The fuel cell stack according to claim 9, wherein an electric power output terminal is disposed on each of the terminal plates, and wherein the electric power output terminal is located between the first coolant passage and the second coolant passage.

11. The fuel cell stack according to claim 10, wherein the end plate has a rectangular shape, and wherein the electric power output terminal is located so as to be offset in a longitudinal direction of the end plate.

12. The fuel cell stack according to claim 8, wherein a cross-sectional area of the first coolant passage and a cross-sectional area of the second coolant passage differ from each other.

13. The fuel cell stack according to claim 8, wherein a length of the first coolant passage and a length of the second coolant passage differ from each other.

14. The fuel cell stack according to claim 8, wherein each of the first coolant passage and the second coolant passage has a meandering shape.

15. The fuel cell stack according to claim 14, wherein each of the first coolant passage and the second coolant passage only includes a portion in which the coolant flows upward and a portion in which the coolant flows in a horizontal direction.

16. The fuel cell stack according to claim 8, wherein the first coolant inlet manifold and the second coolant inlet manifold are independent from each other, and wherein the first coolant outlet manifold and the second coolant outlet manifold are independent from each other.

* * * * *